United States Patent
Stolarczyk

(10) Patent No.: US 6,497,457 B1
(45) Date of Patent: Dec. 24, 2002

(54) DRILLING, IMAGE, AND COAL-BED METHANE PRODUCTION AHEAD OF MINING

(76) Inventor: Larry G. Stolarczyk, 848 Clayton Hwy., Raton, NM (US) 87740

(*) Notice: Subject to any disclaimer, the term of this patent is extended or adjusted under 35 U.S.C. 154(b) by 5 days.

(21) Appl. No.: 09/905,552

(22) Filed: Jul. 12, 2001

Related U.S. Application Data

(60) Provisional application No. 60/295,249, filed on May 31, 2001.

(51) Int. Cl.[7] .............................. E21C 39/00; G01V 3/08
(52) U.S. Cl. .............................. 299/12; 299/19; 175/50; 324/338; 324/351; 702/11
(58) Field of Search .............................. 299/1.1, 12, 19; 175/50; 324/334, 338, 348, 351; 702/11, 12

(56) References Cited

U.S. PATENT DOCUMENTS

| | | | |
|---|---|---|---|
| 3,934,649 A | | 1/1976 | Pasini, III et al. |
| 4,299,295 A | | 11/1981 | Gossard |
| 4,303,274 A | * | 12/1981 | Thakur ........................ 166/50 |
| 4,317,492 A | | 3/1982 | Summers et al. |
| 4,430,653 A | * | 2/1984 | Coon et al. .................... 342/22 |
| 4,577,153 A | | 3/1986 | Stolarczyk |
| 4,691,166 A | | 9/1987 | Stolarczyk |
| RE32,563 E | | 12/1987 | Stolarczyk |
| 4,742,305 A | | 5/1988 | Stolarczyk |
| 4,753,484 A | | 6/1988 | Stolarczyk |
| 4,777,652 A | | 10/1988 | Stolarczyk |
| 4,879,755 A | | 11/1989 | Stolarczyk |
| RE33,458 E | | 11/1990 | Stolarczyk |
| 4,968,978 A | | 11/1990 | Stolarczyk |

(List continued on next page.)

FOREIGN PATENT DOCUMENTS

GB          2231152 A   * 11/1990   ............ G01V/1/40

OTHER PUBLICATIONS

Wang You'An, et al., 2. "Mine Gas And Drainage In China–An Overview", China Coalbed Methane, Dec. 1997, http://www.coalinfo.net.cn/coalbed/eng19973/eng973.htm.
Liu Zhilong, et al., 4. "Coalbed Methane Development, Utilization And Prospect In Yangquan Coal Mining Area", China Coalbed Methane, Dec. 1997, http://www.coalinfo.net.cn/coalbed/eng19973/eng973.htm.
14.News, "Underground Long Horizontal Borehole For Coalbed Methane Drainage Succeeded In Tiefa", China Coalbed Methane, Dec. 1997, http://www.coalinfo.net.cn/coalbed/eng19973/eng973.htm.
16 Abstract, "Proceedings of the 2nd National Symposium On Coalbed Methane (Part 11)", China Coalbed Methane, Dec. 1997, http://www.coalinfo.net.cn/coalbed/eng19973/eng973.htm.

*Primary Examiner*—David Bagnell
*Assistant Examiner*—Daniel P Stephenson
(74) *Attorney, Agent, or Firm*—Richard B. Main

(57) ABSTRACT

A coal mining operation begins by using directional drilling to bore several horizontal shafts through a coal deposit with its natural overburden still intact. Any methane gas permeating the coal deposit is pumped out and preferably sold as natural gas to commercial and residential customers, or used locally in support of mining operations. The methane gas evacuation continues until the concentrations are reduced to safe levels for mining. But before mining begins, ground penetrating radar equipment is lowered into the boreholes for electronic imaging studies of the coal deposit. One borehole is used for a transmitter and another for a receiver. Many measurements are made at a variety of frequencies and equipment positions within the boreholes. Such studies estimate the electrical conductivity of the surrounding material, and thereby give clues where and how much coal is actually deposited. Assessments of the coal reserve are then developed from this information, and used for business planning and mine engineering.

9 Claims, 1 Drawing Sheet

U.S. PATENT DOCUMENTS

Figure 1:
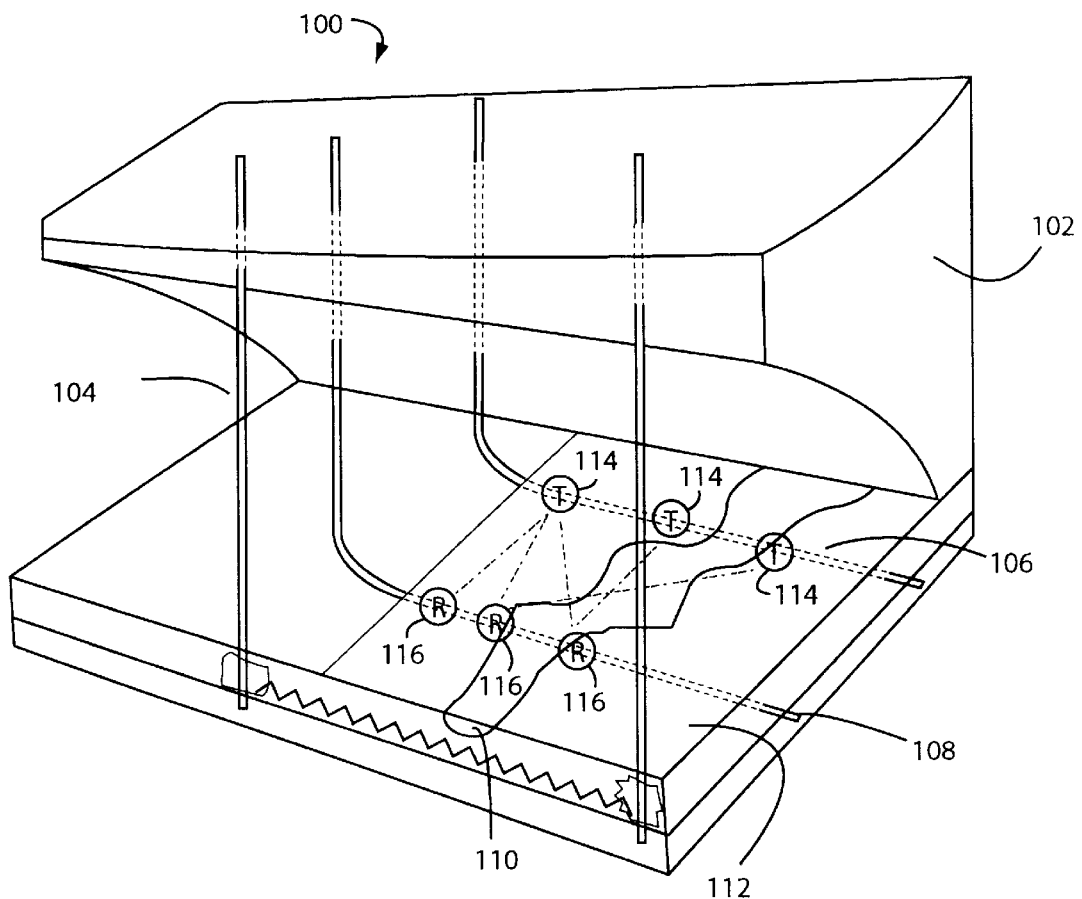

| | | |
|---|---|---|
| 4,994,747 A | 2/1991 | Stolarczyk |
| 5,066,917 A | 11/1991 | Stolarczyk |
| 5,072,172 A | 12/1991 | Stolarczyk |
| 5,087,099 A | 2/1992 | Stolarczyk |
| 5,093,929 A | 3/1992 | Stolarczyk |
| 5,121,971 A | 6/1992 | Stolarczyk |
| 5,146,611 A | 9/1992 | Stolarczyk |
| 5,181,934 A | 1/1993 | Stolarczyk |
| 5,188,426 A | 2/1993 | Stolarczyk |
| 5,260,660 A | 11/1993 | Stolarczyk |
| 5,268,683 A | 12/1993 | Stolarczyk |
| 5,301,082 A | 4/1994 | Stolarczyk |
| 5,408,182 A | 4/1995 | Stolarczyk |
| 5,474,261 A | 12/1995 | Stolarczyk |
| 5,563,846 A * | 10/1996 | Fillon .................. 181/104 |
| 5,686,841 A | 11/1997 | Stolarczyk |
| 5,769,503 A | 6/1998 | Stolarczyk |
| 6,427,124 B1 * | 7/2002 | Dubinsky et al. .............. 702/9 |

* cited by examiner

DRILLING, IMAGE, AND COAL-BED METHANE PRODUCTION AHEAD OF MINING

This application claims the benefit of Provisional Application No. 60/295,249, filed May 31, 2001.

BACKGROUND OF THE INVENTION

1. Field of the Invention

The invention relates generally to coal mining, and more specifically to using directional drilling to bore horizontally through a coal deposit so methane can be drained off to safe levels and electronic imaging with ground penetrating radar to more accurately estimate the true coal reserve.

2. Description of the Prior Art

Natural deposits of coal are sometimes permeated with methane gas, e.g., coalbed methane (CBM). Water seepage is another problem in coal mining, and it needs to be drained off to prevent flooding. In certain concentrations, the methane gas can be explosive and a general hazard to mining operations. So the methane is conventionally vented off until safe concentration levels are reached. Very often this means wasting the gas instead of collecting it and distributing it for sale.

Ventilating furnaces were once used to ventilate mines with chimney drafts. Electric power and fans were yet to be developed. The ventilating furnace was located at the bottom of the mine, and this, of course, posed an ignition hazard for high enough methane concentrations. Explosions caused by the ventilating furnaces were a frequent occurrence.

In U.S. Pat. No. 3,934,649, issued Jan. 27, 1976, Pasini and Overby describe a method for removing methane from coalbeds prior to mining the coal. It comprises drilling at least one borehole from the surface into the coalbed. The borehole is started at a slant rather than directly vertically, and as it descends, a gradual curve is followed until a horizontal position is reached where the desired portion of the coalbed is intersected. Approaching the coalbed in this manner and fracturing the coalbed in the major natural fraction direction cause release of large amounts of the trapped methane gas.

U.S. Pat. No. 4,299,295, issued Nov. 10, 1981, to Amzi Gossard, describes a process for drilling spaced horizontal boreholes in coal and other mineral deposits. The boreholes are typically in excess of 1500 feet long, and patterned to maximize gas removal. Directional drilling guidance is provided by a continuous downhole survey tool connected to data display devices by an internal drill rod cable system. Directional drilling control is provided by a positive displacement motor positioned at the end of the drill string and operated by a flow of drilling fluid through the drill string from the drilling rig. The mineral strata surrounding the borehole is periodically hydrofractured to permit effective removal of the gas. The hydrofractionation is effected without removal of the drill string or survey instruments from the borehole. Upon completion of the borehole, the drill string is removed and gas which enters the borehole from the surrounding deposit is withdrawn.

David Summers, et al., describe in U.S. Pat. No. 4,317,492, a method and apparatus for drilling horizontal holes in geological structures from a vertical bore. The geological structures intended to be penetrated in this fashion are coal seams, as for in situ gasification or methane drainage, or in oil-bearing strata for increasing the flow rate from a pre-existing well. Other possible uses for this device might be for use in the leaching of uranium ore from underground deposits or for introducing horizontal channels for water and steam injections.

The present inventor, Larry G. Stolarzyck, has described methods and equipment for imaging coal formations in geologic structures in many United States Patents. Some of those Patents are listed in Table I, and are incorporated herein by reference.

TABLE I

| Patent No. | Issued | Title |
|---|---|---|
| U.S. Pat. No. 04577153 | Mar. 18, 1986 | Continuous Wave Medium Frequency Signal Transmission Survey Procedure For Imaging Structure In Coal Seams |
| U.S. Pat. No. 04691166 | Sept. 01, 1987 | Electromagnetic Instruments For Imaging Structure In Geologic Formations |
| U.S. Pat. No. 04742305 | May 03, 1988 | Method For Constructing Vertical Images Of Anomalies In Geological Formations |
| U.S. Pat. No. 04753484 | June 28, 1988 | Method For Remote Control Of A Coal Shearer |
| U.S. Pat. No. 04777652 | Oct. 11, 1988 | Radio Communication Systems For Underground Mines |
| U.S. Pat. No. 04879755 | Nov. 07, 1989 | Medium Frequency Mine Communication System |
| U.S. Pat. No. 04968978 | Nov. 06, 1990 | Long Range Multiple Point Wireless Control And Monitoring System |
| U.S. Pat. No. 04994747 | Feb. 19, 1991 | Method And Apparatus For Detecting Underground Electrically Conductive Objects |
| U.S. Pat. No. 05066917 | Nov. 19, 1991 | Long Feature Vertical Or Horizontal Electrical Conductor Detection Methodology Using Phase Coherent Electromagnetic Instrumentation |
| U.S. Pat. No. 05072172 | Dec. 10, 1991 | Method And Apparatus For Measuring The Thickness Of A Layer Of Geologic Material Using A Microstrip Antenna |
| U.S. Pat. No. 05087099 | Feb. 11, 1992 | Long Range Multiple Point Wireless Control And Monitoring System |
| U.S. Pat. No. 05093929 | Mar. 03, 1992 | Medium Frequency Mine Communication System |

TABLE I-continued

| Patent No. | Issued | Title |
| --- | --- | --- |
| U.S. Pat. No. 05121971 | June 16, 1992 | Method Of Measuring Uncut Coal Rib Thickness In A Mine |
| U.S. Pat. No. 05146611 | Sept. 08, 1992 | Mine Communication Cable And Method For Use |
| U.S. Pat. No. 05181934 | Jan. 26, 1993 | Method For Automatically Adjusting The Cutting Drum Position Of A Resource Cutting Machine |
| U.S. Pat. No. 05188426 | Feb. 23, 1993 | Method For Controlling The Thickness Of A Layer Of Material In A Seam |
| U.S. Pat. No. 05260660 | Nov. 09, 1993 | Method For Calibrating A Downhole Receiver Used In Electromagnetic Instrumentation For Detecting An Underground Conductor |
| U.S. Pat. No. 05268683 | Dec. 07, 1993 | Method Of Transmitting Data From A Drillhead |
| U.S. Pat. No. 05301082 | Apr. 05, 1994 | Current Limiter Circuit |
| U.S. Pat. No. 05408182 | Apr. 18, 1995 | Facility And Method For The Detection And Monitoring Of Plumes Below A Waste Containment Site With Radiowave Tomography Scattering Methods |
| U.S. Pat. No. 05474261 | Dec. 12, 1995 | Ice Detection Apparatus For Transportation Safety |
| U.S. Pat. No. 05686841 | Nov. 11, 1997 | Apparatus And Method For The Detection And Measurement Of Liquid Water And Ice Layers On The Surfaces Of Solid Materials |
| U.S. Pat. No. 05769503 | June 23, 1998 | Method And Apparatus For A Rotating Cutting Drum Or Arm Mounted With Paired Opposite Circular Polarity Antennas And Resonant Microstrip Patch Transceiver For Measuring Coal, Trona And Potash Layers Forward, Side And Around A Continuous Mining Machine |
| USRE032563 | Dec. 15, 1987 | Continuous Wave Medium Frequency Signal Transmission Survey Procedure For Imaging Structure In Coal Seams |
| USRE033458 | Nov. 27, 1990 | Method For Constructing Vertical Images Of Anomalies In Geological Formations |

SUMMARY OF THE PRESENT INVENTION

Briefly, a coal mining method embodiment of the present invention begins by using directional drilling to bore several horizontal shafts through a coal deposit with its natural overburden still intact. Any methane gas permeating the coal deposit is pumped out and preferably sold as natural gas to commercial and residential customers, or used locally in support of mining operations. The methane gas evacuation continues until the concentrations are reduced to safe levels for mining. But before mining begins, ground penetrating radar equipment is lowered into the boreholes for electronic imaging studies of the coal deposit. One borehole is used for a transmitter and another for a receiver. Many measurements are made at a variety of frequencies and equipment positions within the boreholes. Such studies estimate the electrical conductivity of the surrounding material, and thereby give clues where and how much coal is actually deposited. More accurate assessments of the coal reserve can then be developed from this information, and the results can be used with much higher confidence than the traditional reserve estimates obtained with conventional methods. The better numbers are preferably used to dictate business planning.

An advantage of the present invention is that a coalbed is first harvested for its methane through a system of boreholes, then the boreholes give access to ground penetrating radar and imaging equipment.

Another advantage of the present invention is that by the time coal mining operations begin, the methane concentrations have been reduced to safe levels and maps of where the coal is deposited have been plotted.

An advantage of the present invention is that a lower cost and higher quality coal mining business can be provided.

Another advantage of the present invention is that paleochannels in the roof of the seam inject water into the coal bed. The horizontal borehole is lined with PVC pipe but not perforated under the channel.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a cut away perspective diagram of a coalbed after being drilled for methane production and imaging by ground-penetrating radar, in a method embodiment of the present invention.

DETAILED DESCRIPTION OF THE PREFERRED EMBODIMENTS

FIG. 1 illustrates a coalbed after being drilled for methane production and imaging by ground-penetrating radar, in a method embodiment of the present invention, the coalbed is referred to herein by the general reference numeral 100. An overburden 102 is penetrated by several boreholes, e.g., a vertical borehole 104 and directional drilled horizontal boreholes 106 and 108. A paleochannel 110 is represented as lying within a tomographic image plane 112. The horizontal borehole is lined with PVC pipe but not perforated under the channel. A paleochannel is often filled with water that must be pumped before methane can be released.

Cavitation methane production is represented as occurring at the bottom of borehole 104 with a Stolar Horizon, Inc., (Raton, N. Mex.) RIM™ seam wave imaging radio wave being transmitted between boreholes. Radio transmitting and receiving equipment is lowered into the boreholes. A number of example transmitting locations (T) 114 are shown in borehole 106, as well as a number of receiving locations (R) 116 for borehole 108. Once the transmitters and receivers are moved to their respective locations 114 and 116, radio waves are sent between to study the effects of the geologic material on the radio reception and different frequencies and signal powers. Synchronous signal detection can be used to advantage to characterize the unknown geologic material by its affect on signal phase. In general, the patents of the present inventor, Larry G. Stolarczyk, will guide the implementation and use of such radio equipment in association with coal deposits. The equipment, products, and services of Stolar Horizon, Inc. (Raton, N. Mex.) can also be used to advantage in embodiments of the present invention.

A method embodiment of the present invention for mining coal comprises the steps of degassing a subterranean coalbed through a plurality of horizontal boreholes, then electronically imaging the coalbed with radio transmitters and receivers positioned at a plurality of locations within the plurality of horizontal boreholes, and then by mapping the geologic distribution of the coalbed from electronic measurement data obtained in the step of electronically imaging. Method embodiments of the present invention further comprise the preliminary step of directional drilling the plurality of horizontal boreholes from a ground surface above the coalbed, as in FIG. 1.

The ore reserves represented by the coalbed can be estimated very accurately from a plot obtained in the step of mapping. A business model embodiment of the present invention plans subsequent mining operations directed at the coalbed from a plot obtained in the step of mapping. In other words, the mining of the coalbed can be controlled from a plot obtained in the step of mapping, e.g., electronic digital models downloaded to computer controlled smart mining equipment.

It has been observed in tests that the step of electronically imaging can differentiate between water deposits and hydrocarbon deposits by the way the apparent conductivity of unknown geologic material responds to a number of different radio carrier frequencies. It is theorized that the dielectric constant has a real component (resistance) and an imaginary component (reactance). In hydrocarbons, the real component is significant. In water, the real component is a near short and is not significant. The frequency changes in the radio imaging equipment therefore effect the reactive component and the receivers measure the complex values that result.

The step of electronically imaging can identify hydrocarbon deposits by looking for the apparent conductivity of unknown geologic material to increase with increasing radio carrier frequencies. Water deposits in paleochannel structures are identified by looking for the apparent conductivity of the unknown geologic material to not increase with increasing radio carrier frequencies. In tests that were conducted, the step of electronically imaging differentiated between water deposits and hydrocarbon deposits by the way the apparent conductivity of the unknown geologic material responds to different radio carrier frequencies in the range of 20.0 KHz to 4.0 MHz. At about 20.0 KHz, radio carrier penetration was as much as ten meters, at 4.0 MHz the penetration of useful signals reduces to about one meter.

The several United States Patent referred to herein would be useful in various implementations of embodiments of the present invention, so each and all are incorporated herein by reference.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of mining coal, comprising the steps of:
   degassing a subterranean coalbed through a plurality of horizontal boreholes;
   electronically imaging said coalbed with radio transmitters and receivers positioned at a plurality of locations within said plurality of horizontal boreholes; and
   mapping a geologic distribution of said coalbed from electronic measurement data obtained in the step of electronically imaging.

2. The method of claim 1, further comprising the preliminary step of:
   directional drilling said plurality of horizontal boreholes from a ground surface above said coalbed.

3. The method of claim 1, further comprising the subsequent step of:
   estimating the ore reserves represented by said coalbed from a plot obtained in the step of mapping.

4. The method of claim 1, further comprising the subsequent step of:
   planning a subsequent mining operation directed at said coalbed from a plot obtained in the step of mapping.

5. The method of claim 1, further comprising the subsequent step of:
   controlling a mining operation of said coalbed from a plot obtained in the step of mapping.

6. The method of claim 1, wherein:
   the step of electronically imaging differentiates between water deposits and hydrocarbon deposits by the way the apparent conductivity of unknown geologic material responds to a number of different radio carrier frequencies.

7. The method of claim 6, wherein:
   the step of electronically imaging identifies hydrocarbon deposits by looking for the apparent conductivity of unknown geologic material to increase with increasing radio carrier frequencies.

8. The method of claim 6, wherein:
   the step of electronically imaging identifies water deposits in paleochannel structures by looking for the apparent conductivity of unknown geologic material to not increase with increasing radio carrier frequencies.

9. The method of claim 1, wherein:
   the step of electronically imaging differentiates between water deposits and hydrocarbon deposits by the way the apparent conductivity of unknown geologic material responds to a number of different radio carrier frequencies in the range of 20.0 KHz to 4.0 MHz.

* * * * *